United States Patent
Dumas et al.

(10) Patent No.: US 6,828,974 B2
(45) Date of Patent: *Dec. 7, 2004

(54) THREE-DIMENSIONAL ARROW

(75) Inventors: Arnaud Ribadeau Dumas, Ville d'Avray (FR); Sebastien Videcoq, Paris (FR)

(73) Assignee: Dassault Systemes, Suresnes Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/434,992

(22) Filed: May 9, 2003

(65) Prior Publication Data

US 2003/0193505 A1 Oct. 16, 2003

Related U.S. Application Data

(62) Division of application No. 09/350,070, filed on Jul. 8, 1999, now Pat. No. 6,573,896.

(51) Int. Cl.[7] .............................................. G06T 15/70
(52) U.S. Cl. .................................................... 345/473
(58) Field of Search ................................ 345/419, 420, 345/421, 424, 426, 427, 428, 473, 474, 620, 622, 672, 958, 959

(56) References Cited

U.S. PATENT DOCUMENTS

| 5,043,922 A | 8/1991 | Matsumoto | 345/422 |
|---|---|---|---|
| 5,680,524 A | 10/1997 | Maples et al. | 345/427 |
| 5,729,673 A | 3/1998 | Cooper et al. | 345/419 |
| 5,798,713 A | 8/1998 | Viebahn et al. | 340/973 |
| 5,812,138 A | 9/1998 | Devic | 345/419 |
| 5,926,186 A | 7/1999 | Itoh et al. | 345/619 |
| 5,999,187 A | 12/1999 | Dehmlow et al. | 345/420 |
| 6,201,549 B1 | 3/2001 | Bronskill | 345/441 |
| 6,256,044 B1 | 7/2001 | Carraro et al. | 345/419 |
| 6,331,861 B1 | 12/2001 | Gever et al. | 345/473 |
| 6,346,940 B1 | 2/2002 | Fukunaga | 345/420 |
| 6,379,249 B1 | 4/2002 | Satsukawa et al. | 273/148 |

OTHER PUBLICATIONS

Article "Visibility with a Moving Point of View" Marshall Bern et al., Proceedings of the first annual ACM–SIAM symposium on Discrete Algorithms, Jan. 1990.

(List continued on next page.)

*Primary Examiner*—Mark Zimmerman
*Assistant Examiner*—Enrique L Santiago
(74) *Attorney, Agent, or Firm*—James V. Mahon

(57) ABSTRACT

A method and apparatus for guiding flight through a computer digital mockup object scene is generated on a display. A three dimensional graphical figure, such as an arrow, is formed on the display to represent a trajectory responsive to positioning of an input device. The three dimensional graphical figure is bent responsive to rotation speed of a viewpoint base; and stretched or compressed responsive to viewpoint translation speed. The visual texture of the three dimensional graphical figure can be altered to indicate an imminent collision of the viewpoint with an object in the digital mock up scene. Altering the texture can include changing the color or presenting a pattern such as a checkerboard or stripes. An imminent collision is determined by computing the viewpoint eye translation along its sight direction and testing the resulting eye position against the depth buffer. The three dimensional graphical figure can also be vibrated back and forth responsive to a collision of the viewpoint with an object in the digital mockup scene.

13 Claims, 6 Drawing Sheets

OTHER PUBLICATIONS

Article "Maintenance of the Set of segments Visible from a Moving Viewpoint in Two Dimensions" by Sherif Ghali et al., Computational Geometry '96, Philadelphia Pa, USA 1996 ACM 0–89791–804–5/96/05, pp. v–3 and v–4.

Article "Dynamic visibility in polygonal scenes with the visibility complex", by Riviere Stephane, Computational Geometry 9, Nice France 1997, ACM 0–89791–878–9/97/06, pp. 421–423.

Article "Constrained 3D Navigation with 2D controllers" by Andrew J. Hanson et al., Computer Science Department, Indiana University Bloomington, IN 47405 USA, 0–8186–8262–0/97, 1997 IEEE, pp. 175–182.

Article "Rapid Controlled Movement Through a Virtual 3D Workspace" by Jock D. Mackinlay et al., Xerox Palo Alto Research Center ACM–089791–344–2/90/008/0171, pp. 171–176.

Article "View Interpolation Using Epipolar Plane Images" by Robert Hsu et al., Department fo Electrical Engineering, University of Tokyo, Bunkyo–ku, Tokyo 113, Japan, 0–8186–6950–0/94, 1994 IEEE, pp. 745–749.

THREE-DIMENSIONAL ARROW

CROSS REFERENCE TO RELATED APPLICATIONS

This application is a divisional of U.S. Ser. No. 09/350,070, filed Jul. 8, 1999 which has been allowed. Now U.S. Pat. No. 6,573,896.

BACKGROUND

The present invention relates to computer software utility programs, and more specifically to a three-dimensional arrow tool to guide fly through motion inside a digital mockup.

Graphically representing motion inside a three-dimensional digital mockup on a computer display can be difficult due to the number of parameters that must be simultaneously managed. In addition, a camera view of a digital mockup offers few, if any, points of reference to guide motion. Without a point of reference, it is easy for an operator to become disoriented within the scene.

Realistic emulation of motion inside a graphical mockup typically includes emulation of the movements of a camera in the scene. In addition, a velocity indicator and proximity detection can enhance motion emulation. Proximity detection can include a point of impact in relation to the camera located at a point from which the three-dimensional digital mockup is being viewed. This camera can also be inclusive of a virtual structure that is being manipulated to alter the view, for example, piloting an airplane, driving a car, operating a tool or other in screen device.

In particular, it is difficult to effect three-dimensional motion inside a digital mockup using a two dimensional pointing device such as a mouse. Other software tools designed to implement three-dimensional motion using a two dimensional pointing device can be awkward to use and unintuitive. For example, it is known to use a two dimensional compass and gauge in close proximity to a navigation tool. A motion direction is then issued from the mouse location. The two visual devices appear on screen, such as a gauge and a compass, to indicate course and azimuth. The known art, however, makes it difficult on a human operator to evaluate simulated motion in an instinctive manner. The operator is forced to perform a conversion from two dimensional features to a three dimensional trajectory. These previously known methods require a user to follow multiple information feedback at one time. A human operator can find it difficult to simultaneously track the compass and the mouse location.

Other previously known approaches include the use of an alternate pointing device such as a joystick. However, this can require additional hardware equipment than that normally deployed on a computer system. In addition, it requires an operator to relocate their hand from one pointing device to the other each time the user needed to effect a simulated motion.

It would be useful, therefore, to have a three dimensional software tool using a standard pointing device to evaluate direction of motion, speed, proximity of virtual objects and collisions during fly motion inside a three-dimensional digital mockup.

SUMMARY OF THE INVENTION

Accordingly, the present invention provides a method and apparatus for guiding flight through a computer digital mockup object scene generated on a display. A three dimensional graphical figure, such as an arrow can be formed on the display to represent a trajectory responsive to positioning of a cursor with an input device. The three dimensional graphical figure can be bent responsive to rotation speed of a viewpoint; and stretched or compressed responsive to viewpoint translation speed.

In one embodiment, the three dimensional graphical figure formed is an arrow with a head part and base part. In one aspect the visual texture of the three dimensional graphical figure can be altered to indicate an imminent collision of the viewpoint with an object in the digital mock up scene. Altering the texture can include changing the color, presenting a pattern or changing the shape. An imminent collision can be determined by computing the viewpoint eye translation along its sight direction and testing the resulting eye position against the depth buffer.

In another aspect, the three dimensional graphical figure can be vibrated back and forth responsive to a collision of the viewpoint with an object in the digital mockup scene. The three dimensional graphical figure can be implemented using multiple slices.

DETAILED DESCRIPTION OF THE INVENTION

Figure 1:
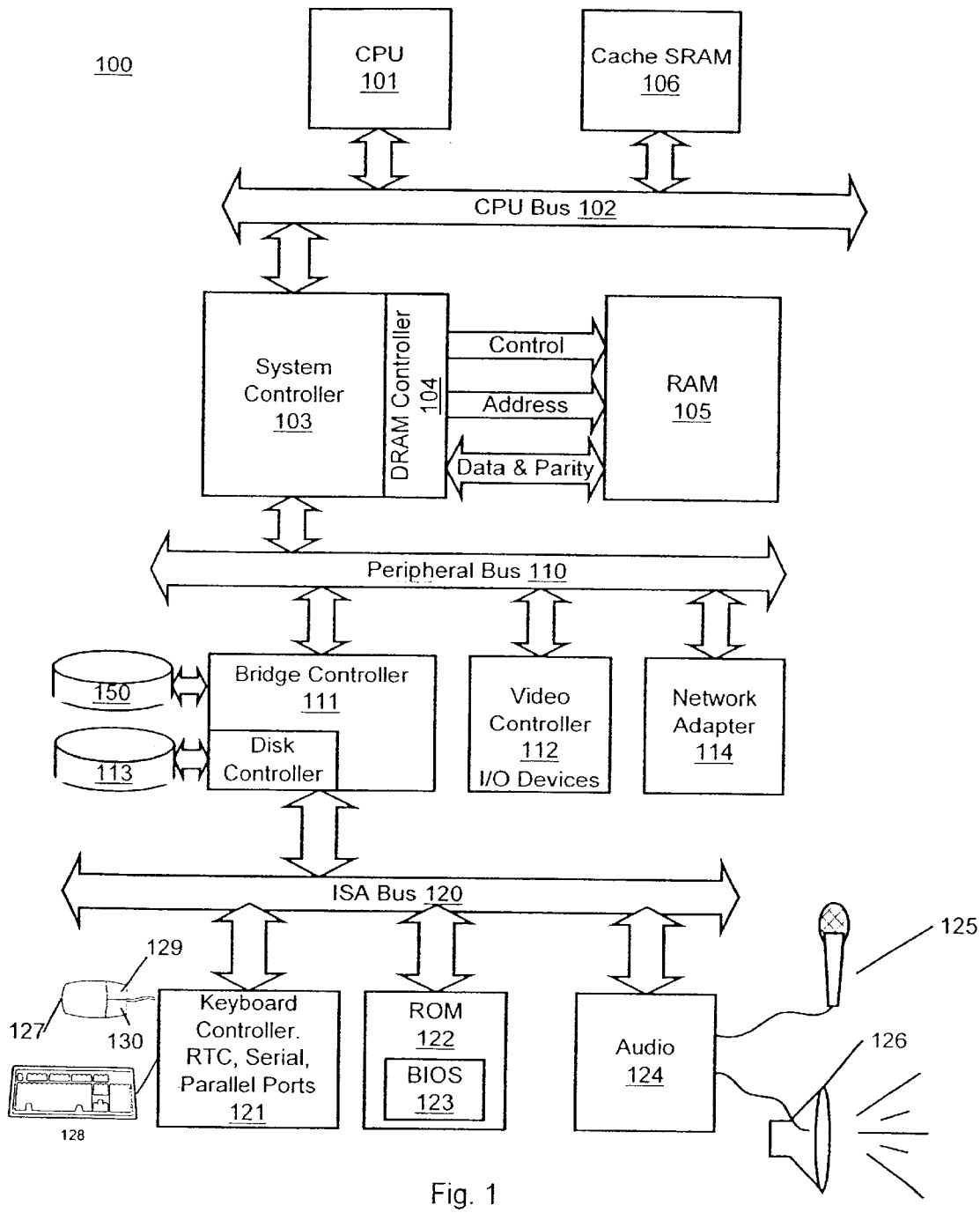
FIG. 1 is a block diagram of a computer system.

Referring to FIG. 1, physical resources of a computer system 100 are depicted. The computer 100 has a central processor 101 connected to a processor host bus 102 over which it provides data, address and control signals. The processors 101 may be any conventional general purpose single-chip or multi-chip microprocessor such as a Pentium® series processor, A K6 processor, a MIPS® processor, a Power PC® processor or an ALPHA® processor. In addition, the processor 101 may be any conventional special purpose microprocessor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to the host bus 102 and provide an interface to random access memory 105. The system controller 103 can also provide host bus to peripheral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a hard disk drive control interface 111 coupled to a hard disk drive 114, a video display controller 112 coupled to a video display 115, and a keyboard and mouse controller 113 can be coupled to a peripheral bus 110 and controlled by the processor 101. The computer system can include a connection to a computer system network, an intranet or an internet. Data and information may be sent and received over such a connection.

The computer 100 can also include nonvolatile ROM memory 107 to store basic computer software routines. ROM 107 may include alterable memory, such as EEPROM (Electronically Erasable Programmable Read Only Memory), to store configuration data. BIOS routines 123 can be included in ROM 107 and provide basic computer initialization, systems testing, and input/output (I/O) services. The BIOS 123 can also include routines that allow an operating system to be "booted" from the disk 113. Examples of high-level operating systems are, the Microsoft Windows 98™, Windows NT™, UNIX, LINUX, the Apple MacOS™ operating system.

An operating system may be fully loaded in the RAM memory 105 or may include portions in RAM memory 105, disk drive storage 114, or storage at a network location. The operating system can provide functionality to execute software applications, software systems and tools of software systems. Software functionality can access the video display controller 112 and other resources of the computer system 100 to provide two dimensional (2-D) and three-dimensional (3-D) models on the video computer display 115.

Figure 2:
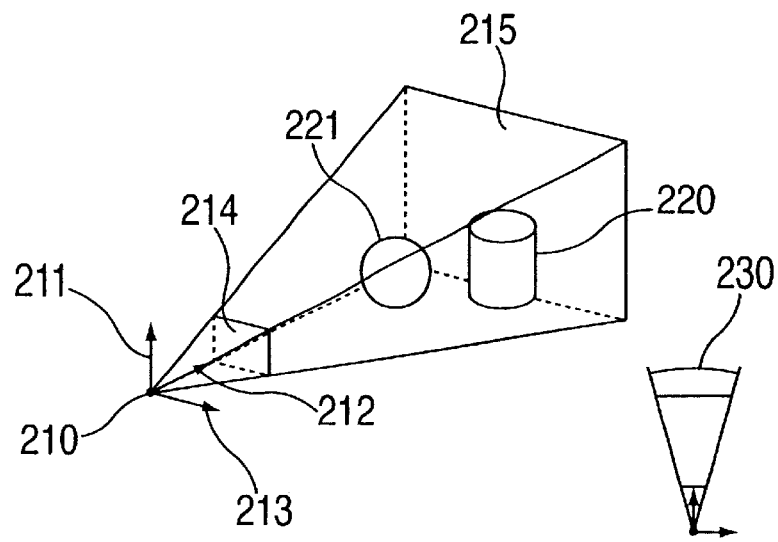
FIG. 2 illustrates the elements of a three dimensional viewer.

Referring now to FIG. 2, a three-dimensional viewer can project objects included in a scene onto a screen by defining a viewpoint, or camera. The viewpoint can include an eye position 210 an up direction 211, a sight direction 212, a right direction 213, a near clipping plane 214 a far clipping plane and a field of view 230. Objects 220 and 221 located between the near clipping plane 214 and the far clipping plane 215 can be included in the object scene.

The eye position and the three vectors (sight, right and up direction) can define the viewpoint base. The fly-through functionality can rely on a motion of this base in the scene coordinates system. In one embodiment the viewpoint, or camera, can be inclusive of a virtual structure that is being manipulated to alter the view. For example, the viewpoint can change responsive to emulating motion of a structure such as piloting an airplane, driving a car, operating a tool or other in scene device.

Figure 3:
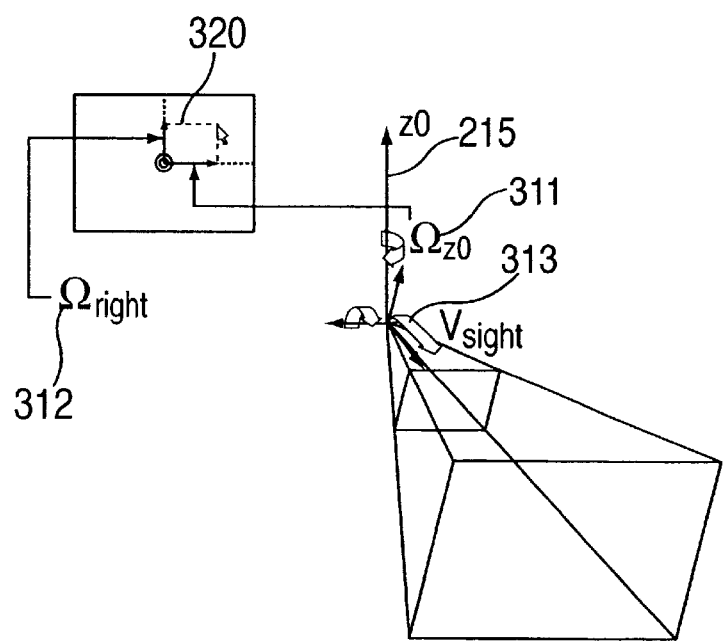
FIG. 3 illustrates a 3 types of transformation.

Referring now to FIG. 3, to effectuate each step of a motion, three kinds of transformation can be consecutively applied to the viewpoint base. The motions can include:

a) rotation of the three directions around the absolute z-axis, or horizontal rotation, by an angle $\theta_{z0}=\Omega_{z0}*\Delta t$, where $\Delta t$ is the time elapsed during the last step, 311;

b) rotation of the sight in an up direction around the right direction, or vertical rotation, by an angle $\theta_{right}=\Omega_{right}*\Delta t$, 312; and c) positive translation of the eye position along the sight direction by a distance $D_{sight}=V_{sight}*\Delta t$, 313.

At each step of the animation, the rotational speeds of the viewpoint base $\Omega_{z0}$ 310 and $\Omega_{right}$ 312 are computed from the relative position of the mouse pointer to the center of the screen 320:

$\Omega_{z0}=\alpha_1*(x_{mouse}-w_{screen}/2)$ $\Omega_{right}=\alpha_2*(y_{mouse}-h_{screen}/2)$ where $\alpha_1$ and $\alpha_2$ are positive constant values and $w_{screen}$ and $h_{screen}$ are the screen 320 bounds.

The translation speed of the viewpoint along its sight direction $V_{sight}$ can be set to a low positive value (adapted to the scene bounds) at the start of the flight and can later be increased or decreased utilizing two keyboard keys such as for example Page Up and Page Down keys. An alternative computation can be made from the position of a sensitive joystick.

Figure 4:
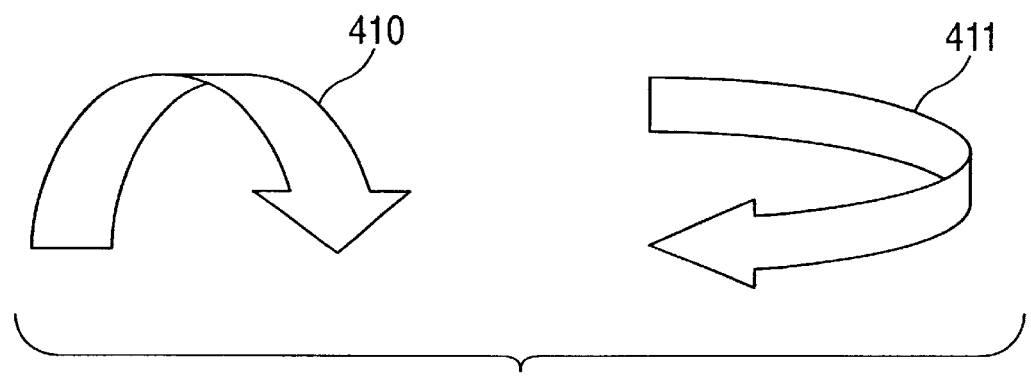
FIG. 4 is an exemplary illustration of a three dimensional arrow tool.

Referring now to FIG. 4, a three-dimensional representation of a trajectory that a current input device position will lead to can be represented as a navigation arrow, or other three dimensional graphical figure. In one embodiment, the three dimensional graphical figure can be illustrated as a three dimensional transparent arrow 410–411 drawn over the scene. When a user moves an input device, the arrow can bend according to the current rotation speed of the viewpoint base. In addition, the three-dimensional arrow can stretch according to a current viewpoint translation speed. An optional collision detection mechanism can be enabled wherein the arrow can also be used to indicate imminent impact with the nearest object in the sight direction.

A value read from a depth buffer at the center of the screen, which is the distance from the viewpoint eye to the nearest object, can be divided by a current translation speed to obtain the delay before a potential traversal. A traversal can appear as a collision in a digital mockup scene. In one embodiment, if this delay falls under a predefined value the color of the arrow can graduate from one color to another, such as green to red. Other implementations can include changing the texture of the arrow, or other three dimensional graphical figure used. Texture variables can include a pattern such as a checkerboard or stripe pattern. In addition, texture variables can include increased brightness of other visual indicator. In another embodiment, collision or imminent collision can be signaled with an audio sound.

Figure 5:
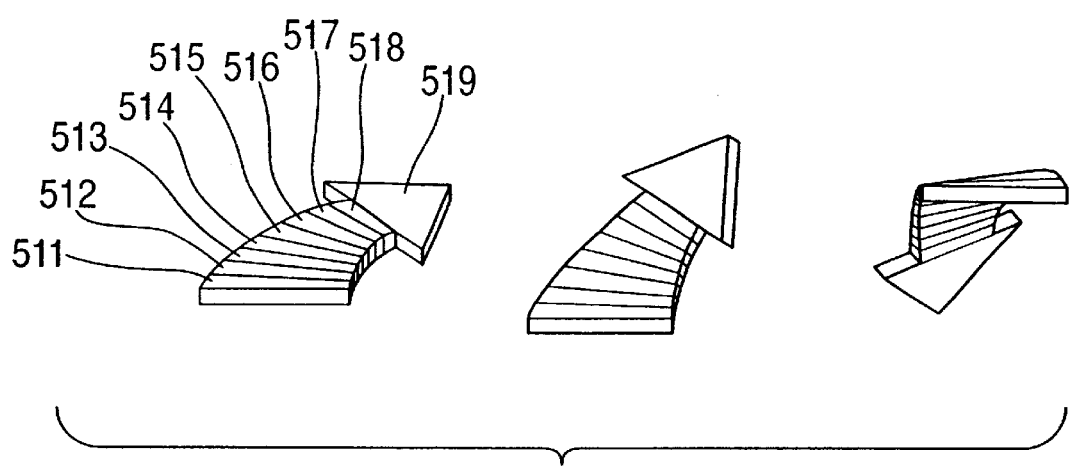
FIG. 5 illustrates a an arrow tool divided into slices.
Figure 6:
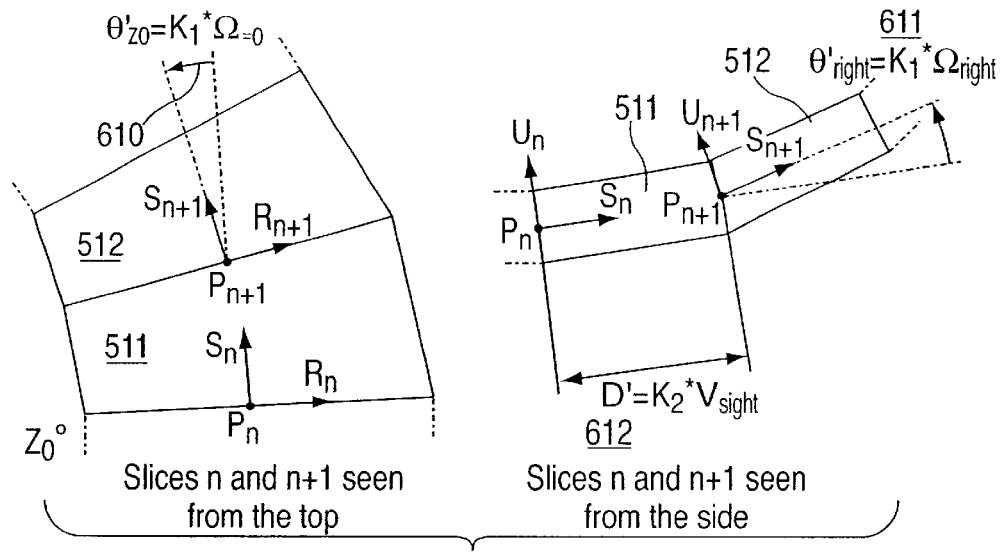
FIG. 6 illustrates alternate views of arrow slices.

Referring now to FIG. 5, for each step of an animation, arrow curvature can be computed by cutting the arrow tail into several slices 511–518, the arrow end is considered as one more slice 519. Referring now to FIG. 6, each slice can be assigned a base $$\left(P_i, \overset{p}{S_i}, \overset{p}{R_i}, \overset{p}{U_i}\right)$$

Each slice base can be thought as a viewpoint base, with the first slice as the current viewpoint base.

Beginning with the first slice 511, each slice base can be computed from the previous one by applying a similar transformation as for the viewpoint base in a fly-through motion, wherein:

rotation of the three directions around the absolute z-axis by an angle $\theta'_{z0} = \Omega_{z0} * K1$, 610;

rotation of $$\overset{p}{S_i} \text{ and } \overset{p}{U_i}$$

around $$\overset{p}{R_i}$$

by an angle $\theta'_{right} = \Omega_{right} * K1$, 611; and translation of $P_i$ along $$\overset{p}{S_i}$$

by a distance $D' = V_{sight} * K2$, 612;

where K1 and K2 are positive constants.

As each slice can be computed from the previous one, by applying transformation depending on the current viewpoint rotation and translation speed, the arrow shape can be made to look like the curve that the viewpoint would describe if the user would keep the same input device position.

Figure 7:
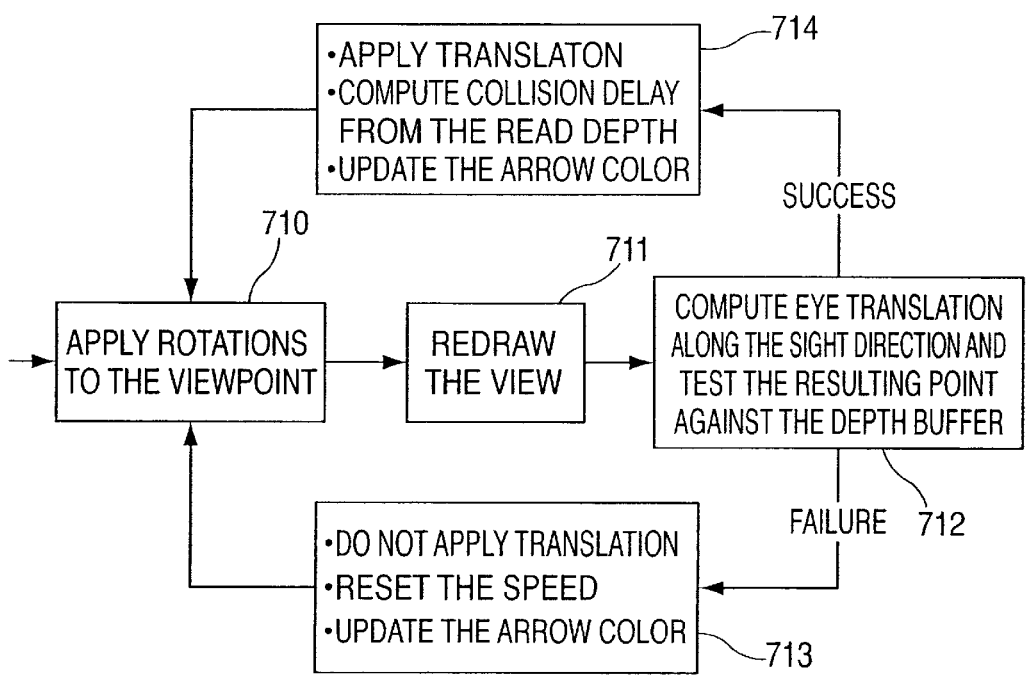
FIG. 7 illustrates a flow of a collision detection feature.

Referring now to FIG. 7, in one embodiment, traversal of a surface of an object in the scene can be avoided by enabling a collision detection feature. Once enabled, this feature can apply rotations to the viewpoint according to the input device position 710 and redraw the scene from the rotated viewpoint 711. After the scene has been redrawn, the program can compute the viewpoint eye translation along its sight direction, and test the resulting eye position against the depth buffer. In one embodiment, the translated point is projected at the center of the screen, in which case the test can consist in a comparison of sight direction ($D_{sight}$) and the value read from the depth buffer at the center of the screen. A target can be drawn at the center of screen to indicate to the user that this point can be used as the reference point to avoid collision. It can also be used as reference point for the mouse input device.

If the test of the eye position against the buffer is a failure, the translated viewpoint can be rejected and indicate a surface traversal will occur during the next step. The system can then process the fly animation by not applying the translation to the viewpoint and resetting the speed 713. In addition the arrow color can be updated.

If the test of the eye position against the buffer is successful, the system can process the fly animation by applying the translation to the viewpoint and processing the next step. The value read in the depth buffer can be used to compute the distance from the viewpoint to the first object in the sight direction, and the delay before the impact. The arrow color can be updated based upon the computed collision delay.

Figure 8:
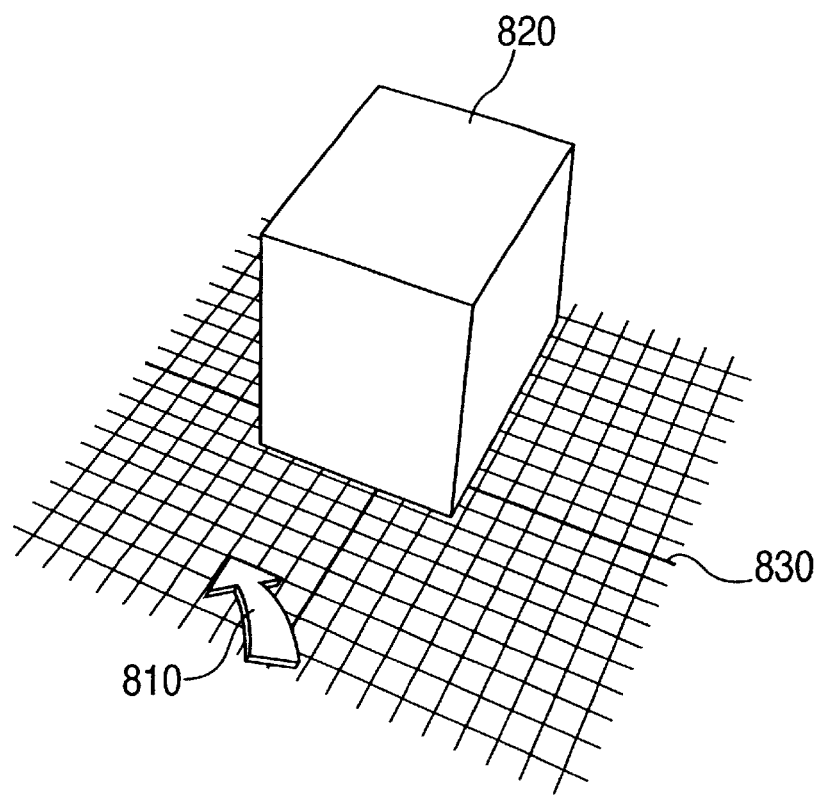
FIG. 8 illustrates an object scene including a three dimensional arrow tool.
Figure 9:
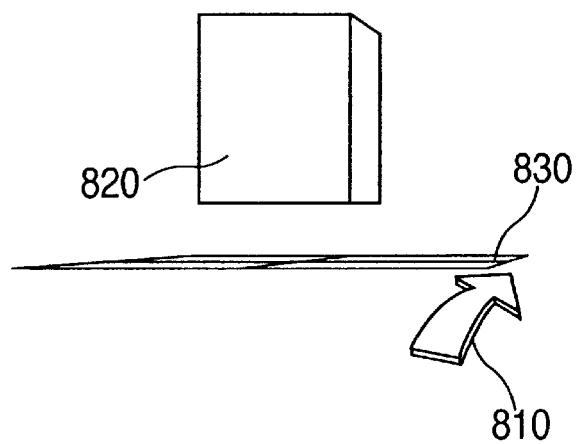
FIG. 9 illustrates an alternative view of the object scene of FIG. 8.
Figure 10:
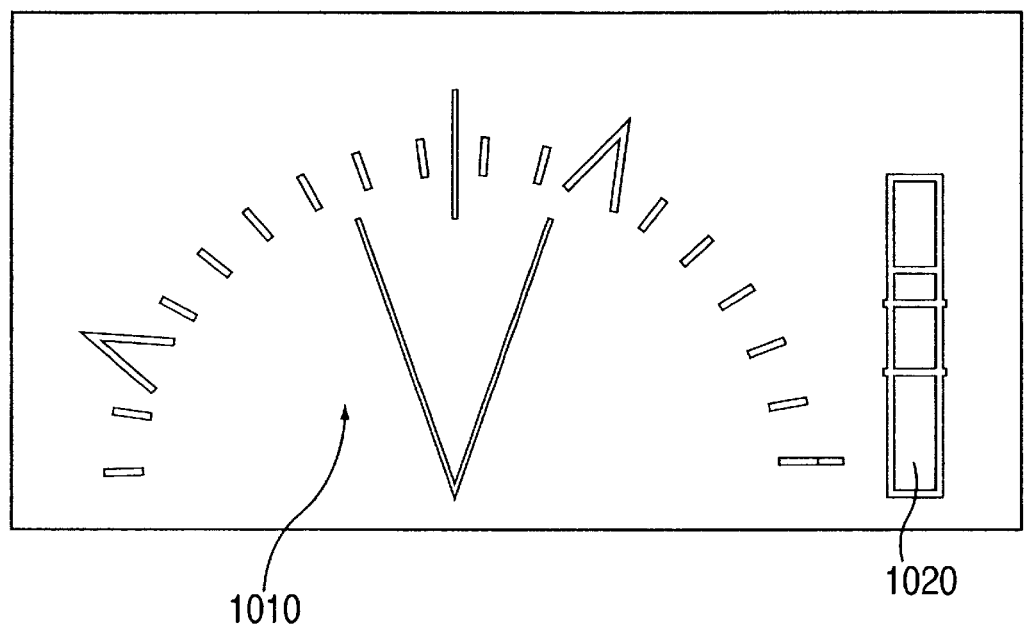
FIG. 10 illustrates a prior art compass and gauge.

Referring now to FIG. 8, an object scene 800 can contain an object 820 and a planar grid 830. A three dimensional arrow 810 can be directed with a pointing device to avoid traversal of the object 820. In the illustration depicted in FIG. 8, the arrow 810 is directed to curve to the left of the object 820 and over the top of the grid 830. Referring now to FIG. 9, the projected path of the three-dimensional arrow 810, in object scene 900, is directed to the right of the object and the planar grid 830. The three dimensional arrow allows the operator to guide motion through the scenes on a three dimensional basis.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. It will be understood that various modifications may be made without departing from the spirit and scope of the invention. Therefore, other implementations are within the scope of the following claims.

What is claimed is:

1. A method of determining a collision between a view point in a digital mockup scene and an object in the scene, the method comprising:

applying rotations to the viewpoint;

redrawing the scene;

computing translation along a sight direction;

testing a point determined by the sight direction translation computation against a depth buffer; and resetting the viewpoint speed and ceasing translation responsive to the test determining a surface traversal will occur.

2. The method of claim 1 additionally comprising the steps of:

applying translation to the viewpoint responsive to the test of the point determining that a surface traversal will not occur.

3. A software tool for displaying collision detection information associated with motion of a viewpoint through a three dimensional digital mockup scene, the software tool comprising:

a graphical figure configured for overlaid display on an image of a three dimensional scene that is formed on a computer display, said image of the scene being formed from a perspective of a viewpoint moving along a trajectory, and wherein:

said graphical figure represents alteration in the trajectory of movement of the viewpoint through the scene, the shape of the trajectory is responsive to positioning of a cursor with an input device, and a visual characteristic of the graphical figure is changed based on distance between a current position of the viewpoint and a computed position at which the viewpoint will traverse a surface of an object in the object scene.

4. The software tool of claim 3 additionally comprising:

a means for bending the graphical figure responsive to rotation speed of a viewpoint; and a means for stretching the graphical figure responsive to an increase in viewpoint translation speed.

5. The software tool of claim 4 additionally comprising:

a means for compressing the graphical figure responsive to a decrease in viewpoint translation speed.

6. The software tool of claim 5 wherein the graphical figure comprises an arrow.

7. The software tool of claim 3 wherein color of the graphical figure is altered responsive to a calculated surface traversal by the viewpoint during a next translation step.

8. A computer-implemented method for displaying a three-dimensional scene, the method comprising:

determining a trajectory of a viewpoint through a three-dimensional object scene, said viewpoint determining a visual position and direction from which an image of the object scene is generated for display on an output device;

moving the viewpoint along the trajectory;

displaying the generated image of the object scene on the output device as the viewpoint moves along the trajectory, wherein said displaying comprises updating the displayed image at a plurality of successive positions of the viewpoint along the trajectory;

simultaneously displaying a graphical figure on the display, said graphical figure being overlaid on said generated image and representing movement of a viewpoint along the trajectory;

altering appearance of the displayed graphical figure to indicate distance between a position of the viewpoint and a position of a first object in the object scene.

9. The method of claim 8 further comprising:

determining that movement of the viewpoint along the trajectory will result in a collision with the first object in the object scene.

10. The method of claim 9 wherein:

altering to indicate distance between a position of the viewpoint and a position of a first object comprises altering to indicate distance between a position of the viewpoint and a position of collision between the viewpoint and the first object.

11. The method of claim 8 wherein the method further comprises altering the shape of the graphical figure in accordance with alterations in the trajectory of the viewpoint so as to visually indicate the alteration of the trajectory of the viewpoint.

12. The method of claim 11 wherein the graphical figure comprises an arrow and altering the shape in accordance with alterations in the trajectory of the viewpoint comprises bending the arrow.

13. The method of claim 8 wherein the graphical figure comprises a pointer.

* * * * *